Aug. 14, 1962     D. L. SPOONER     3,049,621

ENERGY MODULATION

Filed April 9, 1958     2 Sheets–Sheet 1

INVENTOR

David L. Spooner

By Anthony D. Cennamo

Aug. 14, 1962   D. L. SPOONER   3,049,621
ENERGY MODULATION
Filed April 9, 1958   2 Sheets-Sheet 2

INVENTOR
David L. Spooner
By Anthony D. Cennamo

United States Patent Office 3,049,621
Patented Aug. 14, 1962

3,049,621
ENERGY MODULATION
David L. Spooner, Columbus, Ohio, assignor to Industrial Nucleonics Corporation, a corporation of Ohio
Filed Apr. 9, 1958, Ser. No. 727,485
7 Claims. (Cl. 250—83.3)

This invention relates to a device particularly useful for expediting transfer function analyses as in connection with measuring instruments, servomechanisms and continuous industrial processes, and more specifically it relates to a device for modulating a flow of energy in a predetermined manner in order that the response of a system influenced by variations in said energy flow may be readily evaluated.

The invention will be herein illustrated and described in connection with a device for producing sinusoidal modulation of a beam of penetrative radiation energy in order to facilitate testing the frequency response characteristics of a radiation instrument for analyzing the physical properties of a continuous length of material. However, as will appear hereinafter, devices in accordance with the present invention are equally well adapted for modulating the flow of other forms of energy such as fluids under pressure for testing hydraulic or pneumatic servos and other equipment, or they may be used to impart other forms of periodic modulation such as triangular or trapezoidal waveshapes or other wavehapes as well as sinusoidal variations.

For known reasons, it is a common procedure to analyze the performance of various types of equipment, particularly electronic equipment, by testing the frequency response thereof. Such testing is facilitated by the expedient of imposing a sinusoidal variation on the input of the system to be tested and observing the amplitude and/or phase characteristics of the output in relation to the input.

In the past, it has been permissible to more or less completely disregard the matter of frequency response in designing instruments for measuring industrial process variables, since the user of such instruments has been primarily interested in the relatively slow variations in the mean value of such a variable which can be substantially eliminated by suitable process machine operating adjustments performed by manual or automatic means. However, there is an increasing awareness in industry of the fact that the detection of fast and nominally uncontrollable variations in the process output is of great significance as an indicator of maladjustment or need for repairs to the process machine. Accordingly, a great contribution to effective quality control can be made through the use of a variance computer associated with the measuring instrument in the manner disclosed in a copending application Serial No. 668,935, filed July 1, 1957, by Sidney A. Radley, now Patent No. 2,965,300.

The advantages of a convenient and reliable system for determining the frequency response characteristics of such apparatus are evident in consideration of the automatic computation of cigarette making process weight variance. Proceeding with this example, the time required for a cigarette maker to produce one cigarette may be defined as a cigarette time unit. This time unit commonly has a value of around 50 to 100 milliseconds. The individual cigarette is the production sample unit for calculation of variance by the hand weighing and manual computation method. On the other hand, the analog computer analyzes the continuous cigarette rod, utilizing time integrations of continuous electrical weight signal functions. Hence it is found that in order for the analog system to maintain good correlation with the manual computations under various process conditions, the cigarette gauge and/or its associated computer should have a cutoff frequency correlated with the cigarette time unit; that is, around 5 or 10 cycles per second. Since the overall cigarette process computer system includes the radiation detector of a beta ray gauge as well as amplifiers and other electronic gear, the ordinary input to the system which must be simulated consists of the modulation of a beam of beta rays traversing the space between the radiation source and the detector.

There are known techniques for mechanically modulating a beam of penetrative radiation; for example, by the rotating fan disclosed in U.S. Patent No. 2,488,269, issued November 15, 1949, to C. W Clapp, or by the rotating apertured disc disclosed in U.S. Patent No. 2,542,-022, issued February 20, 1951, to H. Friedman. It is also known that a radiation beam comprising charged particles can be modulated magnetically, as is taught by U.S. Patent No. 2,582,981, issued January 22, 1952, to F. A. Fua. In the case of a cigarette gauge, however, the radiation beam traverses only a small area centrally located in the bore of an elongated "pass tube" adapted to accommodate a cigarette diameter and circumvented py shielding to minimize a possible hazard to operating personnel, so that space does not permit the use of a rotating fan or apertured disc. In various attempts to modulate the beta radiation beam magnetically, it was found that electromagnetic coupling with the detector and associated circuitry obtains even in the absence of the radiation source, so that extraneous signals are injected into the system, to the detriment of a valid frequency response analysis.

In accordance with one preferred embodiment of this invention, it is found that these difficulties can be overcome and suitable modulation of the radiation beam effected through the use of what may be termed a helix rod modulator, which comprises an elongated rod or shaft constructed of a material having a first radiation absorption characteristic, and which carries on its periphery a helically arranged portion having a second and different radiation absorption characteristic. This helix rod is placed in the area traversed by the radiation beam and rotated about its central axis as by a motor or other drive means at a predetermined angular rate correlated with the desired beam modulation frequency so that the interception of the beam or portions thereof by the helical portion may vary the attenuation of the beam in a periodic and predetermined manner as illustrated and described hereinafter.

It is an object of this invention to provide novel and useful means for modulating a flow of energy.

It is another object to provide means for modulating an energy flow according to a predetermined periodic function.

It is still another object to provide means for modulating a flow of energy confined to a relatively small and inaccessible area.

It is yet another object to provide means for modulating a flow of energy at a variable frequency while maintaining a predetermined waveshape of said modulation.

It is a further object to provide a helix rod modulator for a beam of radiation having non-uniform characteristics whereby waveshape symmetry is maintained between successive modulation cycles.

It is a still further object to provide a useful accessory for transfer function analysis of measuring instruments, servomechanisms, continuous material processing equipment and the like, whereby such analysis can be performed conveniently and accurately.

It is also an object to provide a modulator system in accordance with the above objects which is simple and inexpensive in the construction and use thereof.

Further objects and advantages will become apparent in the following detailed description of several preferred embodiments of the invention, taken in conjunction with the accompanying drawings, in which.

Figure 1:
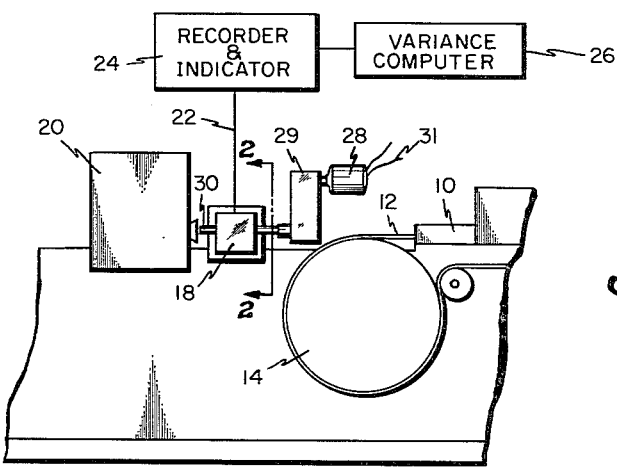
FIGURE 1 is a showing of a test set-up for checking the frequency response of a cigarette rod weight analyzer by the use of a radiation energy modulator in accordance with one form of the invention.

Referring to FIGURE 1, there are shown diagrammatically certain elements of a cigarette making machine having a radiation gauge in conjunction therewith for measuring the variations in weight per unit length of a continuous cigarette rod. The formed cigarette rod (not shown) normally issues from a rod former 10, being carried on an endless tube belt 12 which passes around a drum 14 and is returned to the entrance of the rod former. The cigarette rod departs from the tube belt and continues through a pass tube 16 (FIGURE 2) comprising an opening in the radiation gauge source and detector housing 18, and thence enters a cutter section 20 wherein the continuous rod is cut into lengths to form individual cigarettes.

The gauging head enclosed and supported by the housing 18 is connected by a multiconductor cable 22 to an indicating and/or recording unit 24 which is in turn connected to a variance computer 26.

In order to test the frequency response of the measuring and computing apparatus for the purposes above set forth, in accordance with this invention the traveling cigarette rod which normally occupies the cigarette gauge pass tube 16 is temporarily replaced by a helix rod modulator 30. The modulator 30 is adapted to be chucked in a rotator device which may comprise a synchronous motor 28 which drives the chuck through a speed reduction gear box 29. It is understood that a suitable temporary support (not shown) for the rotator device will be provided so as to hold the modulator axis rigidly in its proper position in the pass tube 16. It is further understood that the synchronous motor 28 is connected to a suitable source of alternating voltage through leads 31.

Figure 2:
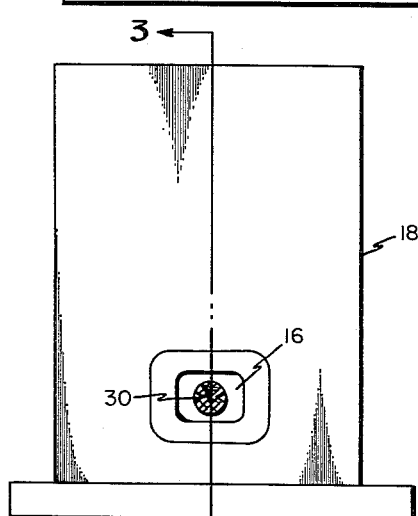
FIGURE 2 is a partial section on the line 2—2 of FIGURE 1 rotated 90° clockwise, showing a right side view of the detector head with the helix rod modulator in place.
Figure 3:
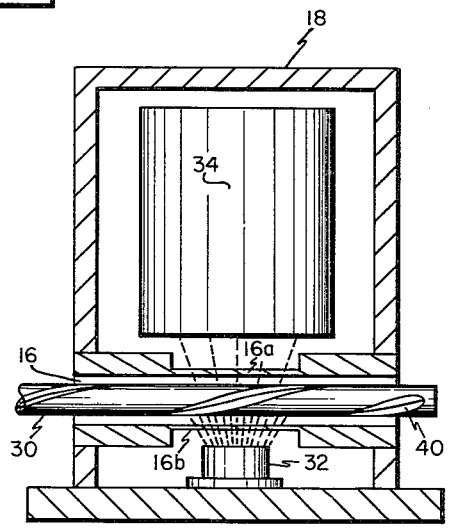
FIGURE 3 is a section on the line 3—3 of FIGURE 2.

FIGURE 2 is a right side view, rotated 90° clockwise, of the source detector housing 18 with the helix rod modulator 30 in place, and FIGURE 3 is a section on the line 3—3 of FIGURE 2. It is seen that the pass tube 16 which normally accommodates the traveling cigarette rod is located between a source 32 of penetrative radiation and a radiation detector 34.

The source 32 comprises a sealed capsule containing a radioactive emitter of beta rays. The detector 34 comprises an ionization chamber. The pass tube 16 positioned therebetween is provided on diametrically opposite sides with a pair of milled thin wall sections 16a and 16b to minimize the absorption of the beta rays by the pass tube while providing a continuous closed metal surface circumventing the passage provided for the transit of the cigarette rod.

In the normal operation of the gauge, the beta rays penetrating the walls of the pass tube are variably attenuated by the cigarette rod in accordance with variations in the mass cross section thereof, so that the response of the detector 34 as indicated on instrument 24 provides a measure of weight per unit length.

During the frequency response testing of the system, a sinusoidal variation in the number of beta rays reaching the detector is effected by the rotation of the helix rod modulator 30 in the pass tube.

Figure 4:
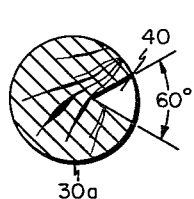
FIGURE 4 is a section perpendicular to the axis of one form of single helix modulator, associated with a sketch of the waveform produced thereby.
Figure 4:
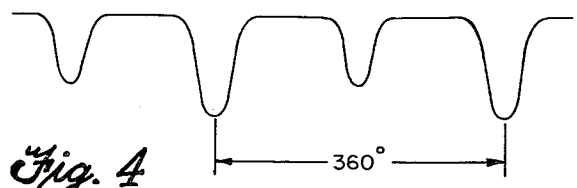

FIGURE 4 shows a section at right angles to the axis of a single helix rod 30a, and the waveform produced when such a modulator is rotated in the pass tube. The modulator 30a comprises a rod typically constructed of wood, specifically dry white pine, and formed by machining a helical groove 40 in the periphery thereof. The faces of the groove intersect at an angle of 60° as shown and the depth of the groove face is approximately one-third the diameter of the rod. The pitch of the helix groove is related to the length of the windows, that is, the thin wall sections 16a and 16b of the pass tube which essentially define the cross section of the radiation beam between the source 32 and detector 34. In this example, the pitch of the helix is four inches in relation to a one-inch length of the windows.

It is found that the single helix rod 30a produces an asymmetrical waveform as shown in FIGURE 4, due to the fact that when the solid portion of the rod interacts with the more intense radiation adjacent to the source window 16b it produces a greater attenuation of the beam than when it is located adjacent the detector window 16a. This may or may not be the case where a helix rod is utilized to modulate other forms of energy as illustrated hereinafter.

Figure 5:
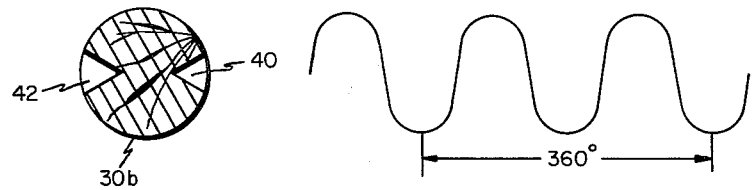
FIGURE 5 is a showing as in FIGURE 4 of a twin helix modulator and corresponding waveshape.

However, it is also found that this asymmetry of the waveform can be eliminated by the use of the twin helix rod 30b shown in FIGURE 5, which has a second identical, and oppositely disposed helical groove 42 in addition to the groove 40. It is seen that this produces a good approximation to a sine wave; producing two modulation cycles per revolution of the rod.

The waveshape shown in FIGURE 5 and produced by the twin helix has been analyzed and found to contain less than 20% harmonic distortion. This is a sufficiently pure sine wave for many instrument response analyses. It is apparent that by changing the groove contour, groove depth, and helix angle, it is possible to greatly reduce the harmonic distortion in the signal produced by the rod in the event that a sine wave of greater purity is required.

Figure 6:
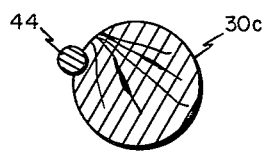
FIGURE 6 is a section perpendicular to the axis of another from of modulator in accordance with the invention.

One other construction for the helix rod modulator is shown in FIGURE 6, which depicts a turned wooden rod 30c having a very shallow helical groove milled therein and a metal wire 44 cemented in the groove.

Figure 7:
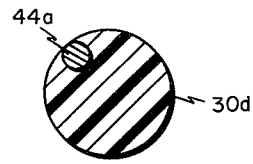
FIGURE 7 is a section as in FIGURE 6 of still another form of modulator.

In still another construction shown in FIGURE 7, a helically wound wire 44a may be molded into a cellular plastic rod 30d.

Obviously other methods of construction may be used, and the helix wires 44 and 44a may be of sectorial or other cross-section rather than circular as shown.

It is seen that a helix rod radiation modulator basically comprises an elongated rod or shaft constructed of a material having a first radiation absorption characteristic, and which carries on its periphery a helically arranged portion having a second radiation absorption characteristic different from that of the body of the rod. Apparently the embodiments shown in FIGURES 2–5 comprise a class of rod modulators wherein the material of the helically arranged portion consists of a channel or cavity in the body portion; that is, an air absorber.

It is apparent that the helix rod principle may be as well adapted to modulate other forms of radiation such as light, X-rays or other electromagnetic or particulate forms of radiation.

Figure 8:
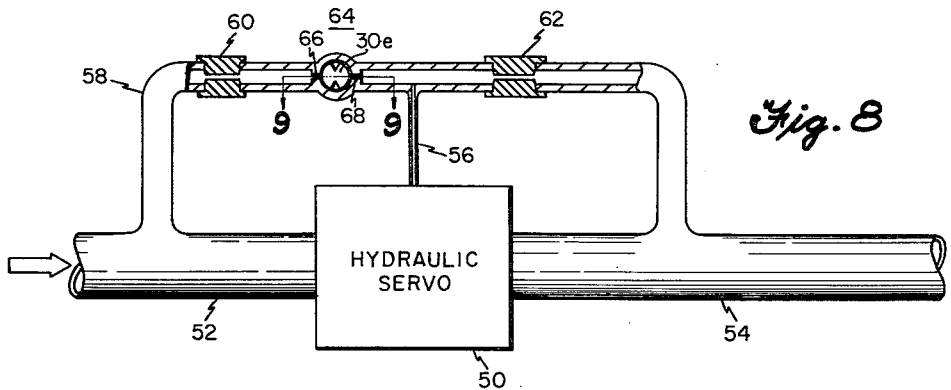
FIGURE 8 illustrates a set-up for testing or operating a fluid servomechanism in connection with a fluid pressure modulator in accordance with the invention.

In FIGURE 8 there is shown diagrammatically a hydraulic servo system 50 powered by fluid pressure from a service line 52 and which discharges fluid into a return pipe 54 when the energy utilized by the servo has been extracted from the service head thereof. In operating or testing the response of the servo system it may be desired to cyclically modulated the pressure at the input line 56, to which the system 50 is responsive.

In accordance with one form of the present invention, a bypass line 58 is provided around the servo, joining the service line 52 to the return pipe 54. Within the bypass are located a pair of suitable fittings 60 and 62 each containing a metering orifice wherein a pressure drop occurs. These fittings may or may not include suitable valves whereby the size of the orifices may be adjusted to regulate the pressure and rate of flow therebetween. Between the metering orifices thereof, the bypass is connected to the controlling input line 56 of the servo 50. Also, between the two orifices and upstream of the connection 56 to the input of the servo, the bypass includes a modulator valve 64 for producing a variable pressure drop between the inlet orifice 50 and the servo input 56.

Figure 9:
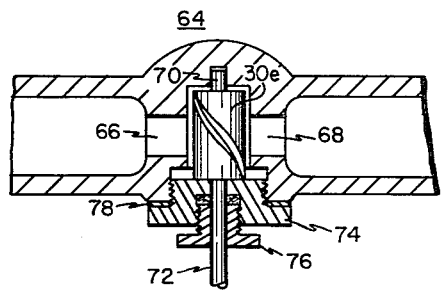
FIGURE 9 is a section on the line 9—9 of FIGURE 8, showing details of a valve incorporating the helix rod modulator.

As is shown by FIGURE 9 in conjunction with FIGURE 8, the modulator valve 64 includes a pair of laterally extended slot orifices 66 and 68 between which is located a helix rod modulator 30e. The modulator 30e has a pair of integral, reduced diameter shaft-portions 70 and 72 for supporting the same and for providing bearing surfaces. The shaft portion 70 extends into a bored opening in the valve housing. The shaft portion 72 is extended to the exterior of the valve through a bushing nut 74 and packing nut 76. A metal gasket 78 under the bushing nut 74 may function as a shim to adjust the end-play of the helix rod in the valve body. It will be noted that at least for some applications it is appropriate to allow an appreciable clearance between the helix rod 30e and the valve housing.

In the operation of the device, the extending shaft portion 72 is connected to a rotator device similar to that described in connection with FIGURE 1. By this means a periodic pressure modulation is imparted to the input connection 56 of the servo system 50 for the purposes hereinabove described or other purposes.

While the invention has been illustrated and described in connection with specific apparatus, such showing and description is meant to be illustrative only and not restrictive, since obviously a great many changes, modifications and various different utilizations can be made without departing from the scope of the invention as is set forth in the appended claims.

What is claimed is:

1. The combination, with a gauging instrument for measuring the mass of a material flow, said instrument including an ionizing radiation source, a radiation detector and guide means between said source and said detector for conducting said material flow therethrough, of means for testing the response of said instrument to mass variations, said testing means including a helix rod modulator comprising a rod having a cylindrical body portion and a helically formed peripheral portion on said body portion, said body portion and said peripheral portion having different radiation absorption characteristics, means for rotatably mounting said rod in said guide means in substitution for said material flow, means for rotating said rod about the longitudinal axis thereof and means for indicating the response of said gauging instrument to the resulting modulation of the radiation flux from said source on said detector.

2. The combination of claim 1 wherein said indicating means includes means for computing the statistical variance of said response.

3. A device as in claim 1 wherein said peripheral portion comprises a channel in the periphery of said body portion.

4. A device as in claim 1 wherein said peripheral portion comprises a protuberance on the periphery of said body portion.

5. A device as in claim 1 wherein said radiation beam is subject to inherent variations in intensity at different points of interaction with said modulator, and wherein said peripheral portion comprises a pair of channels in the periphery of said body portion, said pair of channels being symmetrically located with respect to said axis.

6. A device as in claim 1 wherein said radiation beam is subject to inherent variations in intensity at different points of interaction with said modulator, and wherein said peripheral portion comprises a pair of protuberances on the periphery of said body portion, said pair of protuberances being symmetrically located with respect to said axis.

7. A device as in claim 1 wherein said body portion comprises a first material having one radiation absorption characteristic, and wherein said peripheral portion comprises a second material having an absorption characteristic different from that of said first material.

References Cited in the file of this patent

UNITED STATES PATENTS

| | | |
|---|---|---|
| 2,530,517 | Fua | Nov. 21, 1950 |
| 2,743,390 | Renfro | Apr. 24, 1956 |
| 2,759,108 | Molins | Aug. 14, 1956 |
| 2,800,590 | Gilman | July 23, 1957 |
| 2,886,714 | Ewald | May 12, 1959 |

OTHER REFERENCES

High Transmission Mechanical Neutron-Monochromotor for Filtering of High Order Reflections, by Halt, the Review of Scientific Instruments, vol. 28, No. 1, January 1957, pages 1 to 3.